US009170923B2

(12) United States Patent
Keum et al.

(10) Patent No.: US 9,170,923 B2
(45) Date of Patent: Oct. 27, 2015

(54) APPARATUS AND METHOD FOR TESTING CONFORMANCE OF SERVICE CHOREOGRAPHY

(75) Inventors: Chang-Sup Keum, Daejeon-si (KR); Hyun-Joo Bae, Daejeon-si (KR); Byung-Sun Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 278 days.

(21) Appl. No.: 13/616,794

(22) Filed: Sep. 14, 2012

(65) Prior Publication Data

US 2013/0166966 A1 Jun. 27, 2013

(30) Foreign Application Priority Data

Dec. 27, 2011 (KR) ........................ 10-2011-0143557

(51) Int. Cl.
*G06F 9/44* (2006.01)
*G06F 11/36* (2006.01)

(52) U.S. Cl.
CPC ........ *G06F 11/3672* (2013.01); *G06F 11/3696* (2013.01)

(58) Field of Classification Search
CPC .................................................. G06F 11/3696
USPC .......................................................... 717/128
See application file for complete search history.

(56) References Cited

U.S. PATENT DOCUMENTS

| | | | | |
|---|---|---|---|---|
| 7,340,508 | B1 | 3/2008 | Kasi et al. | |
| 2007/0277158 | A1 | 11/2007 | Li et al. | |
| 2008/0250393 | A1 * | 10/2008 | Bolene et al. | 717/120 |
| 2009/0019427 | A1 * | 1/2009 | Li et al. | 717/126 |
| 2009/0019428 | A1 * | 1/2009 | Li et al. | 717/128 |
| 2010/0162213 | A1 * | 6/2010 | Wieczorek et al. | 717/126 |
| 2011/0138001 | A1 | 6/2011 | Keum et al. | |

FOREIGN PATENT DOCUMENTS

| | | |
|---|---|---|
| KR | 1020040051876 | 6/2004 |
| KR | 1020100022308 | 3/2010 |
| KR | 1020110063084 | 6/2011 |

OTHER PUBLICATIONS

Kalaji et al.; "Automatic generation of test sequences form EFSM models using evolutionary algorithms." School of Information Systems, Computing and Mathematics website; Brunel University(2008).*

Stefanescu et al.; "MBT4Chor: A model-based testing approach for service choreographies." Model Driven Architecture-Foundations and Applications. Springer Berlin Heidelberg, 2009.*

"soapUI"; soapui.org website; Dec. 20, 2010.*

Foster, Howard et al.; "LTSA-WS: A Tool for Model-Based Verification of Web Service Compositions and Choreography"; International Conference on Software Engineering (ICSE'06), May 20-28, 2006.*

* cited by examiner

*Primary Examiner* — Qing Chen
*Assistant Examiner* — Clint Thatcher
(74) *Attorney, Agent, or Firm* — Nelson Mullins Riley & Scarborough LLP; Anthony A. Laurentano, Esq.; Lewis Lee, Esq.

(57) ABSTRACT

An apparatus and method for testing conformance of service choreography are provided. The apparatus for testing conformance of service choreography analyzes an architecture and an operation between web services cooperating on a distributed network to test conformance of a choreography application into which the web services are combined, on the basis of a service choreography specification.

15 Claims, 7 Drawing Sheets

APPARATUS AND METHOD FOR TESTING CONFORMANCE OF SERVICE CHOREOGRAPHY

CROSS-REFERENCE TO RELATED APPLICATION

This application claims the benefit under 35 U.S.C. §119 (a) of Korean Patent Application No. 10-2011-0143557, filed on Dec. 27, 2011, the entire disclosure of which is incorporated herein by reference for all purposes.

BACKGROUND

1. Field

The following description relates to a consumer-oriented convergence service technology based on a network, and more particularly, to a technology for testing conformance of service choreography.

2. Description of the Related Art

Web services operate independently in a network, and provide data and service to an application in units of a logical function. Communication between a web service and an application is performed with a data format and a standardized web protocol such as hypertext transport protocol (HTTP), extensible markup language (XML), simple object access protocol (SOAP), or representational state transfer (REST). Therefore, data flow between all systems is smooth irrespective of a specific platform such as an operating system (OS).

Web services can be provided separately, but most web services provide a multiple business function in composition with other web services. A service composition type is categorized into orchestration and choreography according to a cooperation scheme between web services. The orchestration is a scheme in which there is an arbitrator among a plurality of cooperating web services, and the arbitrator controls a workflow in a centralized scheme. The choreography is a scheme that controls a workflow between a plurality of cooperating web services without an arbitrator. Generally, it is easy to select an arbitrator web service, and thus, the orchestration is used for composition of web services in one organization. The choreography is used for composition of cooperating web services in several business domains.

When developing a choreography application through choreography, web services provided in different business domains are provided in only a black box type, and thus, it is difficult to determine an internal operation. Also, since web services are respectively operated by different organizations, it is required to perform a conformance test that checks an order in which a plurality of cooperating web services exchange messages, and whether all web services participating in choreography well perform an expected operation overall, on the basis of only specifications described in a prearranged protocol. Since the conformance test is a test that checks a desired function on the basis of specifications, the conformance test is the most fundamental test that needs be performed prior to a performance test or an availability test.

U.S. Patent Publication No. 20070277158 discloses technology that changes a business process expressed as WSDL to an object-oriented language element and performs a unit test. Korean Patent Publication No. 2004-0051876 discloses data generation technology of a single web service that relates to a web service test and a test method using WSDL.

SUMMARY

The following description relates to an apparatus and method for testing conformance of service choreography, which test whether a service choreography application for achieving a business purpose operates as per specifications according to a prearranged protocol through cooperation of web services on a distributed network.

In one general aspect, a method of testing conformance of service choreography includes: analyzing an architecture and an operation between web services cooperating on a distributed network to test conformance of a choreography application into which the web services are combined, on the basis of a service choreography specification.

In another general aspect, an apparatus for testing conformance of service choreography includes: a test model and test architecture changer configured to change a service choreography specification to a test model and a test architecture; a test scenario generator configured to generate a test scenario in consideration of a coverage of the test model and the test architecture; and a test executor configured to execute the test scenario in the test architecture to test the web services.

Other features and aspects will be apparent from the following detailed description, the drawings, and the claims.

Figure 1:
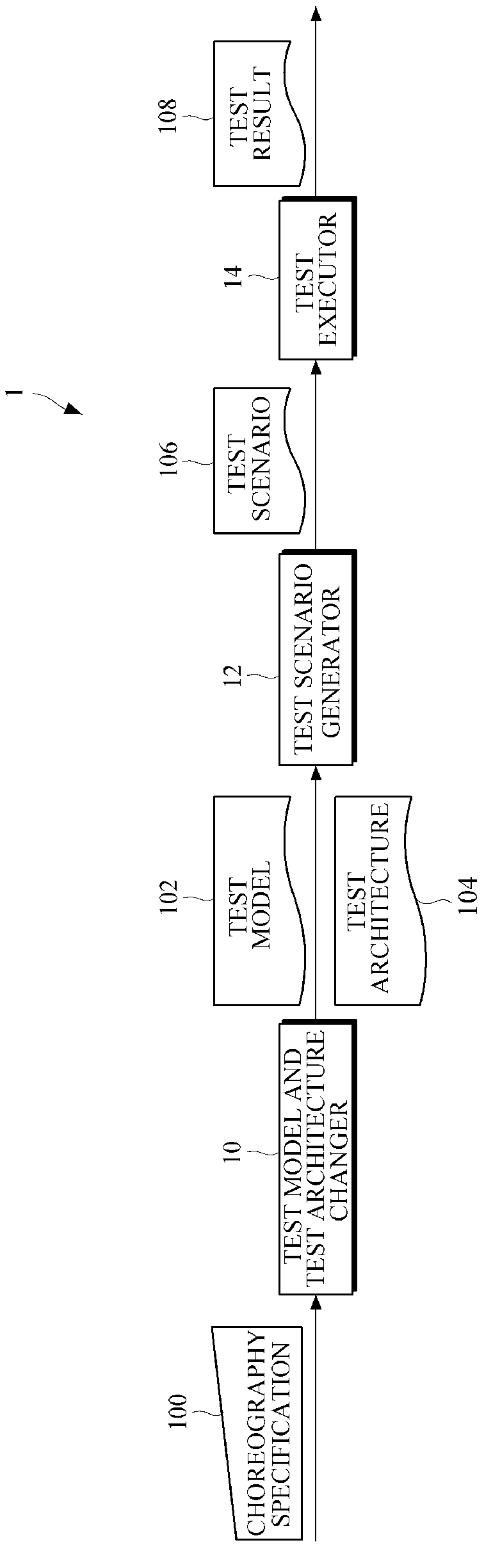
FIG. 1 is a block diagram illustrating an apparatus for testing conformance of service choreography according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, embodiments of the present invention will be described in detail with reference to the accompanying drawings. In the following description, when the detailed description of the relevant known function or configuration is determined to unnecessarily obscure the important point of the present invention, the detailed description will be omitted. Moreover, the terms that have been defined as described above may be altered according to the intent of a user or operator, or conventional practice. Therefore, the terms should be defined on the basis of the entire content of this specification.

FIG. 1 is a block diagram illustrating an apparatus 1 for testing conformance of service choreography according to an embodiment of the present invention.

Referring to FIG. 1, the apparatus 1 for testing conformance of service choreography (hereinafter referred to as a conformance tester) includes a test model and test architecture changer 10, a test scenario generator 12, and a test executor 14.

The test model and test architecture changer 10 changes a service choreography specification 100 to a test model 102 and a test architecture 104. The service choreography specification 100 may be described in a web service choreography definition language (WS-CDL). The WS-CDL is a specification language that has been recommended by the World Wide Web Consortium (W3C) as standard for describing service choreography.

The test model 102 may be a global extended finite state machine (EFSM). The test architecture 104 includes a tester and a test monitor. The tester executes a test scenario. The test monitor is disposed in a message link that connects a plurality of web services disposed at different positions physically. The test monitor includes a point of observation (PO) apparatus that monitors the content of a message transmitted and received between web services, and a point of control and observation (PCO) apparatus that corrects a web service message.

According to an embodiment, the test model and test architecture changer 10 extracts an operational function from the service choreography specification and changes the extracted function to a test model. Also, the test model and test architecture changer 10 extracts an architecture function from the service choreography specification and changes the extracted function to a test architecture. The operational function includes a message exchange interaction between web services and a message data format. The architecture function includes a role between the web services and an interaction between the web services.

The test scenario generator 12 generates a test scenario 106 in consideration of a coverage of the test model 102 and the test architecture 104. The test scenario 106 represents a test sequence that is generated according to the test architecture 104.

The test executor 14 executes the test scenario 106 in the test architecture 104 to test web services, thereby obtaining a test result 108. According to an embodiment, the test executor 14 executes the test scenario 106 with the tester and monitors whether a web service message transmitted and received between web services satisfies an input/output value and a message procedure described in the test scenario 106 with the test monitor.

Figure 2:
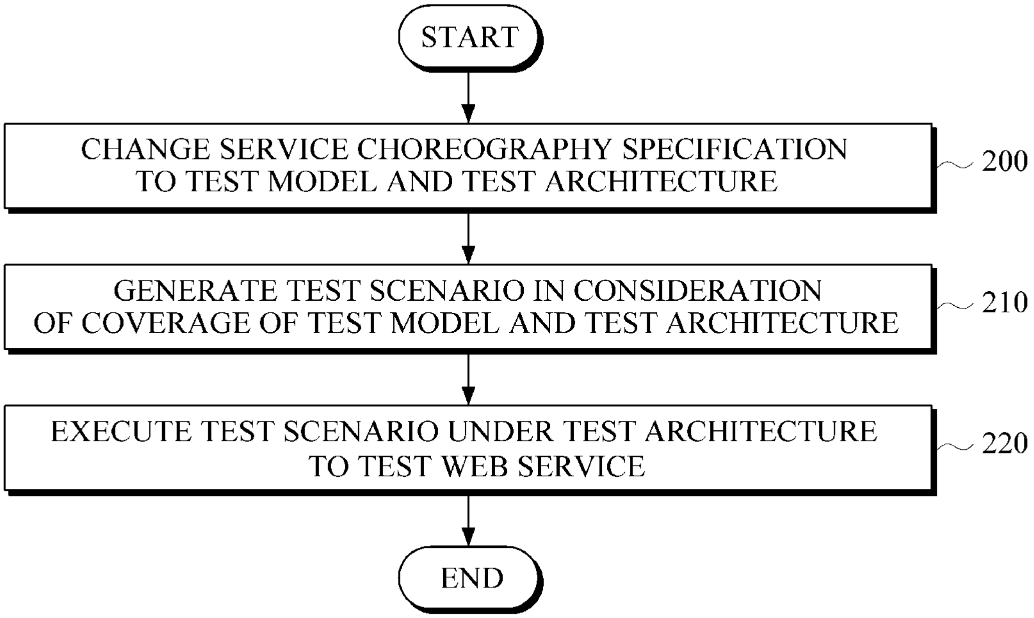
FIG. 2 is a flowchart illustrating a method of testing conformance of service choreography according to an embodiment of the present invention.

FIG. 2 is a flowchart illustrating a method of testing conformance of service choreography according to an embodiment of the present invention.

Referring to FIGS. 1 and 2, the conformance test apparatus 1 analyzes an interaction architecture of web services cooperating on a distributed network and a control flow and data flow of a message transmitted and received between the web services to thereby test conformance of a choreography application into which a plurality of web services are combined, on the basis of the service choreography specification. To this end, a process of testing conformance of service choreography is broadly divided into three stages 200, 210 and 220.

In a first stage 200, the conformance test apparatus 1 changes the service choreography specification to the test model 102 and the test architecture 104 with the test model and test architecture changer 10. The service choreography specification may be described in the WS-CDL. The WS-CDL includes a part 1 that describes a dynamic behavior side such as a message exchange interaction sequence between web services that participates in composition and have the same level, a part 2 that describes a message data format, and a part 3 that describes a static side such as a role and an interaction relationship between participating web services.

The test model and test architecture changer 10 changes a part, associated with the part 1 and part 2 of the WS-CDL, to a global EFSM test model. The global EFSM test model represents a control flow and data flow of a message exchange sequence between web services participating in the choreography application, in an overall perspective. The global EFSM test model is configured with a state, a transition, an input event, an output event, and a variable. When the input event or the output event occurs, a certain state is changed to a different state.

The test model and test architecture changer 10 changes a part, associated with the part 3 of the WS-CDL, to the test architecture 104. The test architecture 104 includes the tester and the test monitor. The tester executes a test scenario. The test monitor is disposed at the message link that connects a plurality of web services disposed at different positions physically. The test monitor includes the PO apparatus that checks the content of a message transmitted and received between web services and the PCO apparatus that corrects a web service message.

Among processes of the first stage 200, a process that changes the operational function of the WS-CDL to the global EFSM test model will be described below with reference to FIG. 3, and a process that changes the architecture function of the WS-CDL to the test architecture 104 will be described below with reference to FIG. 4.

In a second stage 210, the test scenario generator 12 of the conformance test apparatus 1 receives the global EFSM test model and the test architecture 104 that are generated by the test model and test architecture changer 10, and generates the test scenario 106 in consideration of both a coverage of the test model 102 and the test architecture 104. The test scenario may be a set of scenarios.

Unlike a conformance test for a single web service, the conformance test apparatus 1 dynamically monitors a message exchange sequence between web services cooperating independently on the distributed network to thereby determine a test result while performing the test scenario 106, by using the test executor 14. To this end, the test scenario generator 12 needs to generate the test scenarios 106 in consideration of the test model 102 and consider the coverage of the test model 102.

According to an embodiment, the test scenario generator 12 selects a test model coverage according to a traversal reverence visiting all transitions that connect states between the global EFSM test model, on the basis of a control-flow coverage. According to another embodiment, the test scenario generator 12 selects a test model coverage according to a reference traversing a path that connects a state defined for all variables used in the global EFSM test model and a state where a corresponding variable has been used, on the basis of a data-flow coverage.

In a third stage 220, the test executor 14 executes the test scenario 106 generated by the test scenario generator 12 to determine a test result, under the test architecture 104 changed by the test model and test architecture changer 10. When an error occurs, the test executor 14 analyzes the cause of the error.

As an example of the test result determined by the test executor 14, the test executor 14 determines the test result in consideration of both a response message which the tester receives from a web service and a message transmitted and received between web services which the test monitor monitors. For example, when both a response message the tester receives and a message processing result between web services sensed by the PO apparatus and the PCO apparatus pass, a final pass is determined, but when at least one of the response message and the message processing result do not pass, a final failure is determined. The failure includes a case in which a message expected in the test scenario 106 is not received and a different message is received, or an abnormal end is performed.

When an error occurs, it is not easy to determine which of web services participating in service choreography caused the error with no inspection other than the tester inspecting only a response message. The test executor 14 checks a message link, which is a communication line between web services, with the test monitor when the test scenario 106 is being executed. Therefore, a web service causing an error can be easily determined.

Figure 3:
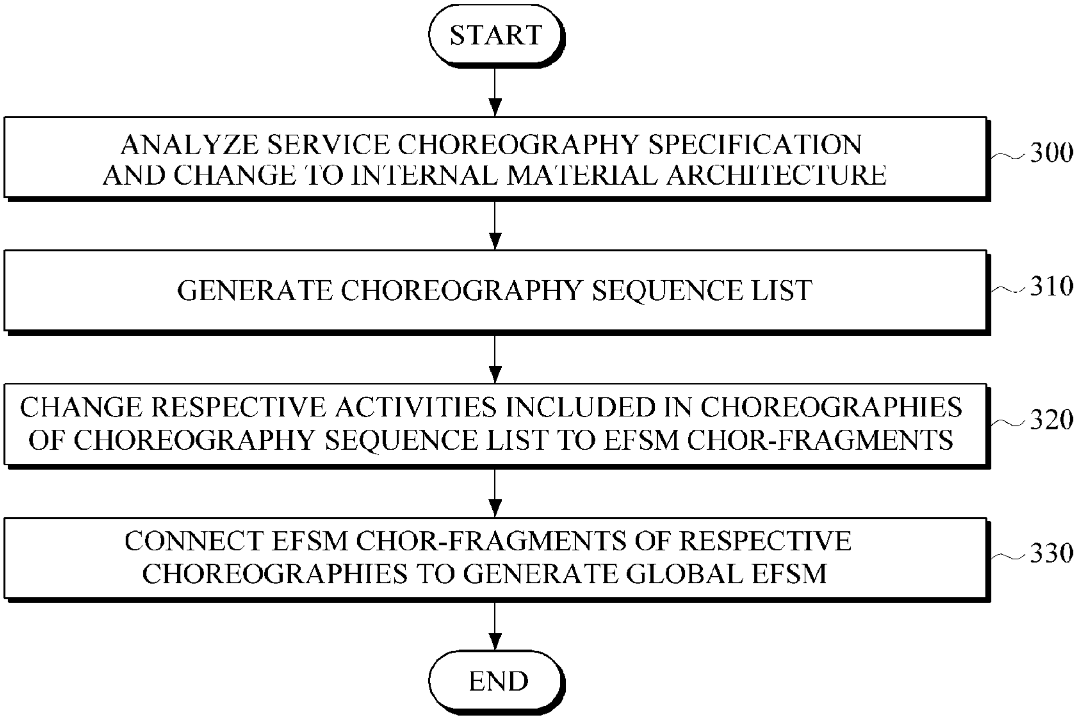
FIG. 3 is a detailed flowchart of a process of changing a service choreography specification to a global EFSM model in a process of testing conformance of service choreography according to an embodiment of the present invention.

FIG. 3 is a detailed flowchart of a process of changing a service choreography specification to a global EFSM model in a process of testing conformance of service choreography according to an embodiment of the present invention.

Referring to FIGS. 1 and 3, the test model and test architecture changer 10 extracts an operational function representing an order in which web services exchange messages in the service choreography, and changes the extracted operational function to the global ESFM that enables the test scenario 106 to be more easily generated.

To this end, the test model and test architecture changer 10 analyzes a WS-CDL choreography specification described in extensible markup language (XML) to parse the XML (which is an advance preparation operation that enables a change to the global EFSM model), thereby performing a process that changes the WS-CDL choreography specification to an internal material architecture in process 300.

When the WS-CDL choreography specification has not a single choreography but a plurality of choreographies, the test model and test architecture changer 10 searches an uppermost-level choreography and connects lower-level choreographies that are in a call relationship with the uppermost-level choreography, thereby generating a choreography sequence list in process 310. In single choreography, processes 320 and 330, where the test model and text architecture changer 10 generates EFSM chor-fragments for a plurality of choreographies and assembles the EFSM chor-fragments, are not performed.

Subsequently, the test model and test architecture changer 10 changes all activities, included in respective choreographies of the choreography sequence list, to the EFSM chor-fragments in process 320.

The EFSM chor-fragment is a global EFSM fragment in which a separate choreography spec has been changed to a portion of the EFSM test model. In this case, a syntax related to a basic activity, such as <interaction>, <message exchange>, <assign>, and <workunit> included in choreography, is changed to EFSM chor-sub-fragment. The sequence of EFSM chor-sub-fragments is arranged for a syntax related to a sequence control activity, such as <sequence>, <parallel>, and <choice>, using the basic activity, and then the syntax is changed to EFSM chor-fragment corresponding to one choreography spec.

Subsequently, the EFSM chor-fragment is an EFSM fragment of separate choreography, and thus, the text model and test architecture changer 10 connects EFSM chor-fragments of respective service choreographies to generate the global EFSM test model on the basis of the choreography sequence list in process 330.

Figure 4:
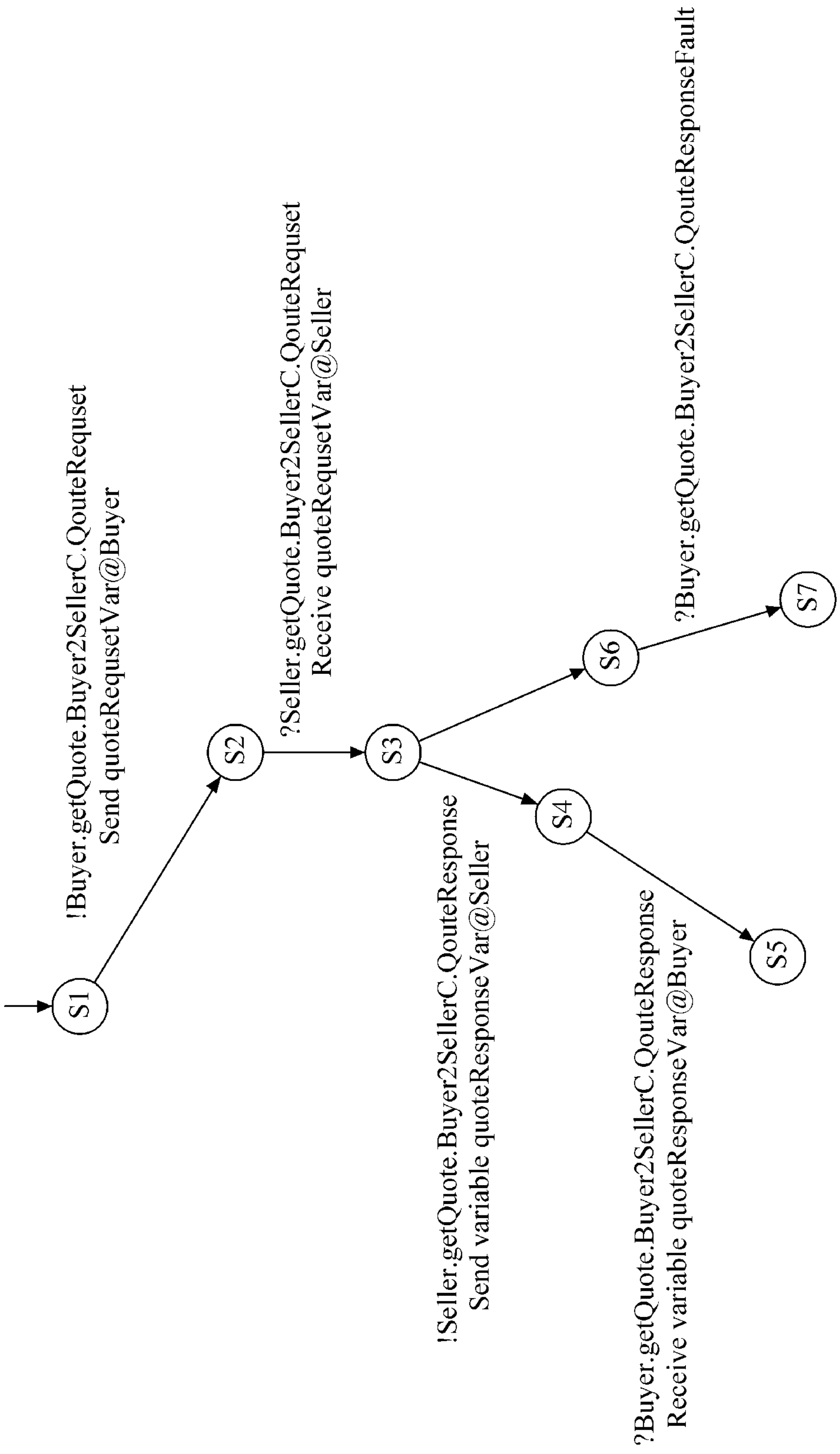
FIG. 4 is a reference diagram illustrating an embodiment of an EFSM fragment.

FIG. 4 is a reference diagram illustrating an embodiment of an EFSM fragment.

Referring to FIG. 4, the WS-CDL specification describes which message and in which order and through which channel a web service performing a buyer function and a web service performing a seller function exchange. The present invention changes the WS-CDL specification to the EFSM test model. In the EFSM test model, the input event and the output event may be expressed in the following formats, respectively.

Input event: ?partipant.operation.channel.message

Output event: !partipant.operation.channel.message where the participant denotes the kind of a web service that transmits or receives a message, the operation denotes an operation that performs a web service function, the channel denotes a channel for exchanging a message between web services, and the message denotes the name of a message exchanged between web services.

As examples of the input event and the output event, as illustrated in FIG. 4, an output event "!Buyer.getQuote.Buyer2SellerC.QuoteRequest" moving from a state S1 to a state S2 denotes that a buyer web service transmits QuoteRequest to getQuote operation through a channel called Buyer2SellerC, in the state S1, and then moves to the state S2. Such an event is respective activities being changed to EFSM fragments through WS-CDL analysis.

Figure 5:
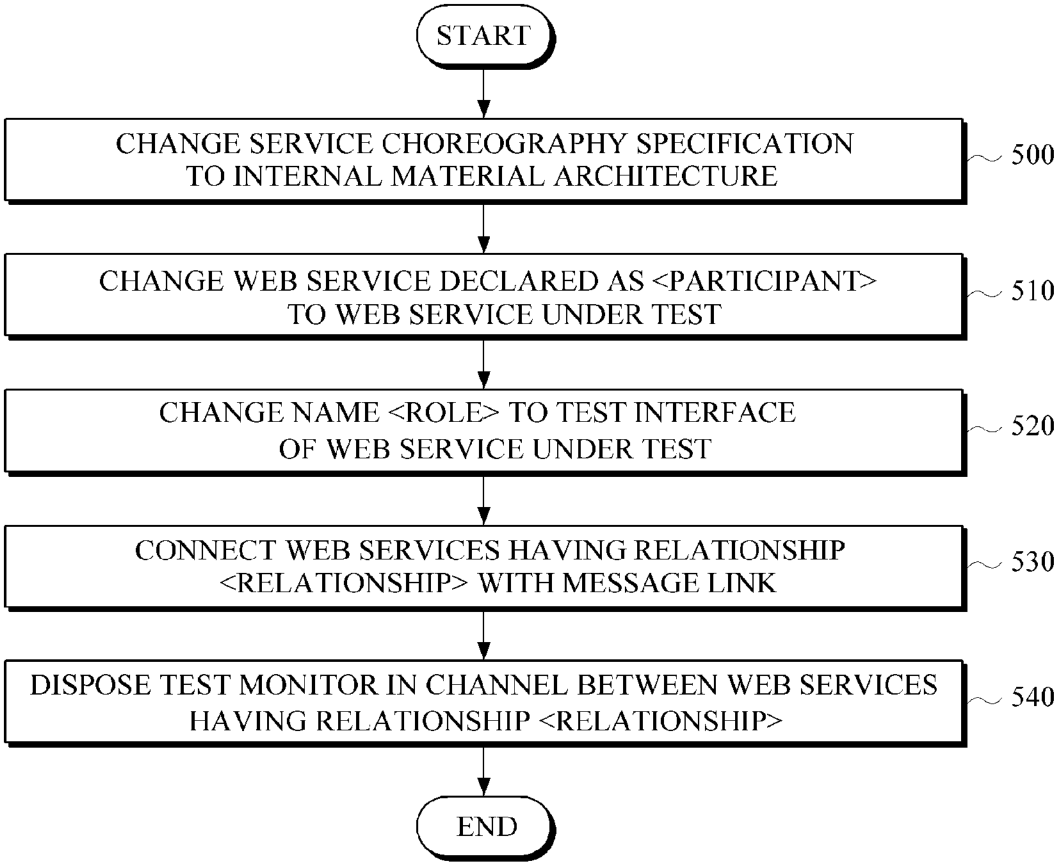
FIG. 5 is a detailed flowchart of a process of changing the service choreography specification to a test architecture in a process of testing conformance of service choreography according to an embodiment of the present invention.

FIG. 5 is a detailed flowchart of a process of changing the service choreography specification to a test architecture in a process of testing conformance of service choreography according to an embodiment of the present invention.

Referring to FIGS. 1 and 5, the test model and test architecture changer 10 analyzes the WS-CDL to change the WS-CDL to an internal material architecture in process 500. Then, the test model and test architecture changer 10 changes a web service, which has been declared as <participant> in the changed internal material architecture, to a web service under test (hereinafter referred to as a WUT) in process 510, changes a name <role> to a test interface of the WUT in process 520, and connects web services having a relationship <relationship> with the message link in process 530. In this case, a web service performing a client role is replaced by the tester.

According to an additional aspect, the test model and test architecture changer 10 disposes the PO apparatus or the PCO apparatus in a channel that is an information exchange port between web services having the relationship <relationship>, and thus completes the change of a test architecture in process 540. The PO apparatus is disposed when intending to monitor a message transmitted from a message line between web services. The PCO apparatus is disposed when intending to monitor a message and moreover correcting and sending the message. It is obvious that the test architecture varies widely according to the number of channels requiring dynamic monitoring and a scheme in which the PC apparatus or the PCO apparatus is disposed in a corresponding channel.

Figure 6:
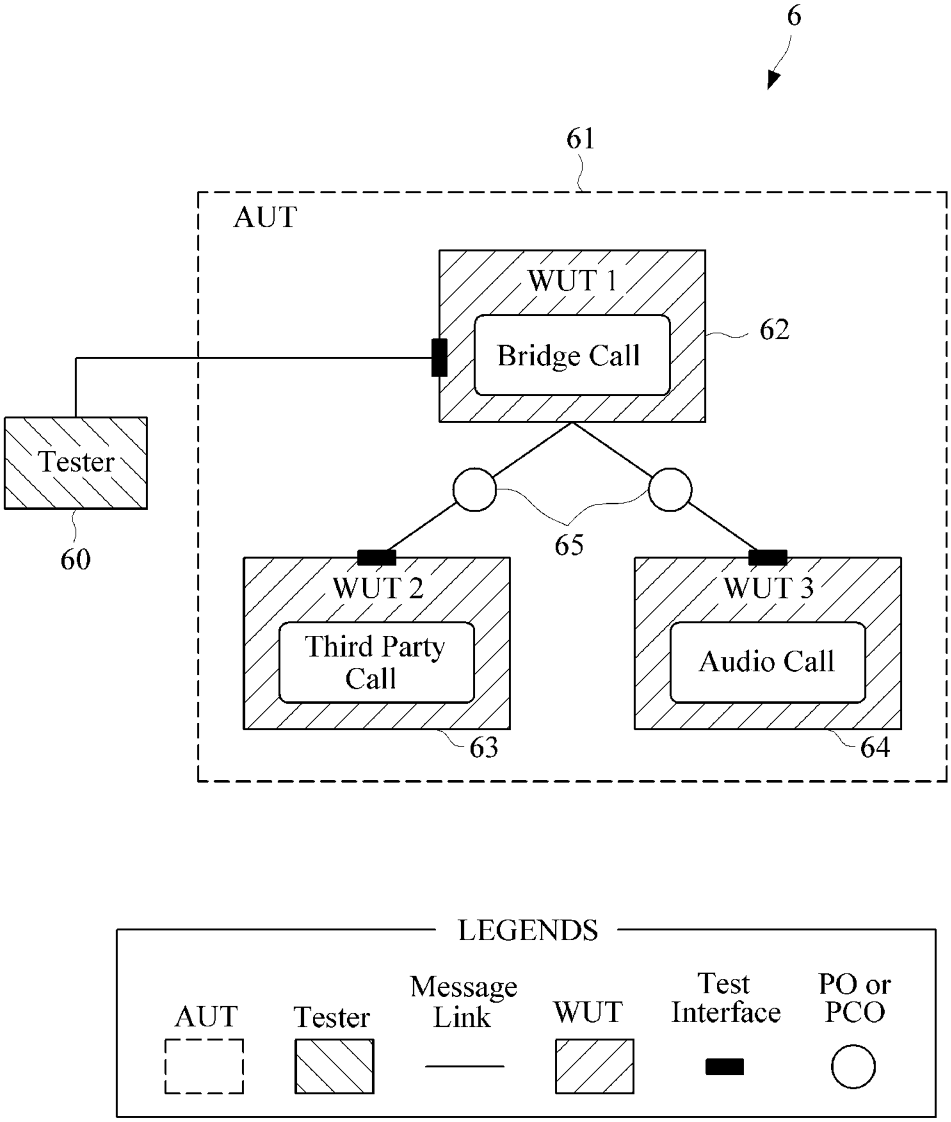
FIG. 6 is an exemplary diagram illustrating a test architecture according to an embodiment of the present invention.

FIG. 6 is an exemplary diagram illustrating a test architecture 6 according to an embodiment of the present invention.

Referring to FIG. 6, an application under test (AUT) 61 is a choreography application target and provides a desired function in cooperation with WUTs 62 to 64 to a client on a distributed network. The WUTs 62 to 64 may receive an inter-web protocol (for example, SOAP) message or respond to the received message through a test interface. The WUTs 62 to 64 are connected by a message link, and a test monitor (PO or PCO) 65 may be disposed in the message link. A tester 60 performs a client role to execute a test scenario. When the test scenario is executed, the PO apparatus monitors whether a web service message transmitted and received between the WUTs 62 to 64 satisfies an input/output value and a message procedure described in the test scenario, and the PCO apparatus corrects the web service message.

As illustrated in FIG. 6, a test architecture including the test monitor (PO or PCO) 65 accurately determines a message exchange sequence between web services when a test scenario is being executed, and thus early detects the cause of an error by using the PO apparatus or the PCO apparatus, compared to a test architecture having a single tester.

The test architecture having the single tester is capable of determining conformance only when an initial request message passes through a plurality of cooperating web services and then a final response is received, in which case it is still not easy to determine which web service causes an error. However, according to the present invention, when a response message to a request message transmitted to the tester 60 is an abnormal error message, the PO apparatus or PCO apparatus disposed in the message link dynamically monitors a message transmitted and received between web services, and thus, a web service having a malfunction that causes an error can be easily detected. For example, as illustrated in FIG. 6, by monitoring a message transmitted and received between the WUT1 62 and the WUT2 63 and a message transmitted and received between the WUT1 62 and the WUT3 64, a web service having a malfunction that causes an error is detected from among Bridge Call of the WUT1 62, Third Party Call of the WUT2 63, and Audio Call of the WUT3 64.

Figure 7:
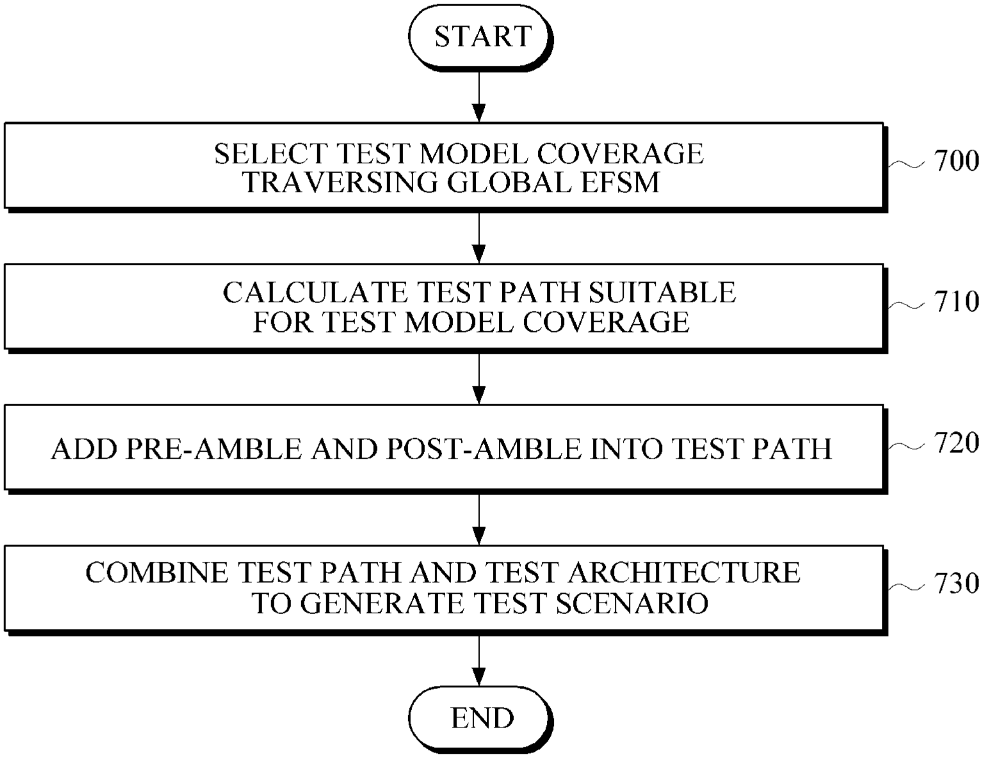
FIG. 7 is a detailed flowchart of a process of generating a test scenario from a test model and a test architecture according to an embodiment of the present invention.

FIG. 7 is a detailed flowchart of a process of generating a test scenario from a test model and a test architecture according to an embodiment of the present invention.

Referring to FIGS. 1 and 7, a test scenario is a test sequence that is generated according to a test architecture, and for example, is as follows.

Tester!SetupCallRq, PO1?MakeCallRq, PO1?MakeCallRp, PO2?AddCallRq, PO2?AddCallRp, Tester?SetupCallRp where PO1 is an apparatus that monitors a message line connecting the WUT1 62 and WUT2 63 of FIG. 6, and PO2 is an apparatus that monitors a message line connecting the WUT1 62 and WUT3 64 of FIG. 6.

The test scenario denotes that when a tester transmits a SetupCallRq message, the PO1 receives a MakeCallRq message, the PO2 receives an AddCallRq message, and finally the tester receives the SetupCallRq message.

The above-described test scenario is obtained in the following sequence. First, the test scenario generator 12 selects a test coverage that traverses the global EFSM test model in process 700. The test coverage may be selected according to a reverence traversing all transitions that connect states of the global EFSM test model, on the basis of a control flow. Alternatively, the test coverage may be selected according to a reference traversing a path that connects a state defined for all variables used in the global EFSM test model and a state where a corresponding variable has been used, on the basis of a data flow.

Subsequently, the test scenario generator 12 calculates a global EFSM test path suitable for the test coverage in process 710. Then, when the start state of the calculated test path does not start from an initial state, the test scenario calculates a pre-amble that is a shortest path from the initial state to the start state of the test path, and adds the pre-amble into a fore portion of the test path. Even when a final state of the calculated test path is not ended as the start state, the test scenario generator 12 adds a post-amble, which is a shortest path from the final state to the initial state, into the test path in process 720.

Subsequently, when the test path with the pre-amble and post-amble added therein is a path through which the PO apparatus or the PCO apparatus passes in a test architecture, the test scenario generator 12 combines a test path and a test architecture to generate a test scenario in process 730.

According to the embodiments of the present invention, it is easy to determine whether web services cooperating on a distributed network operate normally overall or separately. That is, on the basis of the service choreography specification, by analyzing an architecture and an operation between the web services cooperating on the distributed network and testing conformance of the choreography application into which web services are combined, a web service having a malfunction that causes an error can be easily checked.

Moreover, the present invention automatically generates a service test scenario from the service choreography specification, executes the test scenario in the test architecture to monitor and control dynamic message exchange between web services, and thus can easily pre-detect the cause of an error compared to a test scheme using only a single tester.

Furthermore, the present invention generates the systematized and automated test scenario, quickly analyzes an error using the test architecture, minutely checks a coverage with the global EFSM test model, and thus can considerably reduce a time taken in testing conformance of service choreography for providing a high-quality service choreography application.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of testing conformance of service choreography, the method comprising:

analyzing, via a processor, an architecture and an operation between web services cooperating on a distributed network to test conformance of a choreography application into which the web services are combined, on the basis of a service choreography specification;

changing, via the processor, the service choreography specification to a test model and a test architecture;

generating, via the processor, a test scenario in consideration of a test model coverage and the test architecture;

executing, via the processor, the test scenario in the test architecture to test the web services by checking a message link when the test scenario is executed, wherein the message link is a communication line between each web service in the test scenario;

monitoring, via the processor, whether a web service message transmitted and received between the web services satisfies an input or output value and a message procedure described in the test scenario with a test monitor, or correcting the web service message; and inspecting, via the processor, a response message which a tester receives from a web service and a message transmitted and received between web services monitored by the test monitor to thereby determine whether an error occurs for the each web service, wherein a point of observation (PO) to monitor content of the web service messages is disposed in the message link and a point of control and observation (PCO) correcting the web service message is disposed in the message link.

2. The method of claim 1, wherein the service choreography specification is described in WS-CDL.

3. The method of claim 1, wherein the changing of the service choreography specification comprises:

extracting an operational function from the service choreography specification to change the extracted function to the test model; and extracting an architecture function from the service choreography specification to change the extracted architecture function to the test architecture.

4. The method of claim 3, wherein the operational function comprises a message exchange interaction between the web services and a message data format.

5. The method of claim 3, wherein the architecture function comprises roles of the web services and an interaction between the web services.

6. The method of claim 3, wherein the extracting of an operational function comprises changing the service choreography specification to a global EFSM test model.

7. The method of claim 6, wherein the changing of the service choreography specification to a global EFSM test model comprises:

changing the service choreography specification to an internal material architecture;

searching an uppermost-level service choreography in the internal material architecture, and connecting a plurality of lower-level service choreographies which are in a call relationship with the uppermost-level service choreography to thereby generate a choreography sequence list; and changing respective activities, comprised in the service choreographies of the choreography sequence list, to EFSM fragments, and connecting the EFSM fragments of the respective service choreographies to generate a global EFSM test model on the basis of the choreography sequence list.

8. The method of claim 3, wherein the extracting of an architecture function comprises:

changing the service choreography specification to an internal material architecture; and changing a web service, which has been declared as <participant> in the changed internal material architecture, to a web service under test (WUT), changing a name <role> to a test interface of the WUT, and connecting web services having a relationship <relationship> with a message link.

9. The method of claim 8, further comprising disposing a test monitor in a channel between the web services having the relationship <relationship>.

10. The method of claim 1, wherein the generating of a test scenario comprises:

selecting the test model coverage which traverses the test model;

calculating a test path corresponding to the test model coverage, and adding a pre-amble and a post-amble into the test path when necessary; and combining the test path and the test architecture to generate a test scenario.

11. The method of claim 10, wherein the selecting of the test model coverage comprises selecting the test model coverage according to a reference traversing transition which connects states of the test model, on the basis of a control flow.

12. The method of claim 10, wherein the selecting of the test model coverage comprises selecting the test model coverage according to a reference traversing a path that connects a state defined for a variable used in the test model and a state where a corresponding variable has been used, on the basis of a data flow.

13. An apparatus for testing conformance of service choreography, the apparatus comprising:

a processor configured to:

change, via a test model and test architecture changer, a service choreography specification to a test model and a test architecture;

generate, via a test scenario generator, a test scenario in consideration of a coverage of the test model and the test architecture; and execute, via a test executor, the test scenario in the test architecture to test the web services, wherein the test executor:

executes a test scenario with a tester in the test architecture by checking a message link when the test is executed, wherein the message link is a communication line between each web service in the test, monitors whether a web service message transmitted and received between the web services satisfies an input or output value and a message procedure described in the test scenario with a test monitor, or corrects the web service message, and inspects a response message which the tester receives from one of the web services and a message transmitted and received between the web services monitored by the test monitor to thereby determine whether an error occurs for each web service, wherein a point of observation (PO) to monitor content of the web service messages is disposed in the message link and a point of control and observation (PCO) correcting the web service message is disposed in the message link.

14. The apparatus of claim 13, wherein the test model and test architecture changer extracts an operational function from the service choreography specification to change the extracted function to the test model, and extracts an architecture function from the service choreography specification to change the extracted architecture function to the test architecture.

15. The apparatus of claim 13, wherein the test model and test architecture changer changes the service choreography specification to a global EFSM test model.

* * * * *